United States Patent
Abe et al.

(10) Patent No.: US 12,377,855 B2
(45) Date of Patent: Aug. 5, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Koji Abe, Tokyo (JP); Hiroyuki Tokunaga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 18/280,484

(22) PCT Filed: Mar. 30, 2021

(86) PCT No.: PCT/JP2021/013487
§ 371 (c)(1),
(2) Date: Sep. 6, 2023

(87) PCT Pub. No.: WO2022/208646
PCT Pub. Date: Oct. 6, 2022

(65) Prior Publication Data
US 2024/0140434 A1    May 2, 2024

(51) Int. Cl.
*B60W 30/182*    (2020.01)
*B60W 30/14*    (2006.01)
(Continued)

(52) U.S. Cl.
CPC ........ *B60W 30/182* (2013.01); *B60W 30/143* (2013.01); *B60W 50/082* (2013.01);
(Continued)

(58) Field of Classification Search
None
See application file for complete search history.

(56) References Cited

U.S. PATENT DOCUMENTS

| | | |
|---|---|---|
| 5,927,419 A | 7/1999 | Tokimoto |
| 2003/0045990 A1 | 3/2003 | Adachi |

(Continued)

FOREIGN PATENT DOCUMENTS

| | | |
|---|---|---|
| JP | 09-123883 | 5/1997 |
| JP | 2003-063272 | 3/2003 |

(Continued)

OTHER PUBLICATIONS

International Search Report and Written Opinion for International Application Serial No. PCT/JP2021/013487 mailed on Jun. 22, 2021, 9 pages.

*Primary Examiner* — Wade Miles
*Assistant Examiner* — Arslan Azhar
(74) *Attorney, Agent, or Firm* — Amin, Turocy & Watson, LLP

(57) ABSTRACT

A vehicle control device includes a decider configured to decide on a start and a cancelation of a travel mode in which a vehicle travels at or below a target speed set by a driver of the vehicle and a controller configured to control traveling of the vehicle in the travel mode in accordance with a decision result of the decider. The decider sets a state of the cancelation of the travel mode as a deferred state when the operation amount of a brake operation on a brake pedal of the vehicle is less than or equal to a threshold value if a cancelation operation is performed according to the brake operation when the start of the travel mode is decided on in accordance with a first start operation and the controller controls the traveling and decides to continue the travel mode when a second start operation different from the first start operation is performed in the deferred state.

14 Claims, 4 Drawing Sheets

(51) Int. Cl.
*B60W 50/00* (2006.01)
*B60W 50/08* (2020.01)
*B60W 50/14* (2020.01)

(52) U.S. Cl.
CPC ..... *B60W 50/14* (2013.01); *B60W 2050/0083* (2013.01); *B60W 2050/143* (2013.01); *B60W 2050/146* (2013.01); *B60W 2520/10* (2013.01); *B60W 2540/106* (2013.01); *B60W 2540/12* (2013.01)

(56) References Cited

U.S. PATENT DOCUMENTS

| | | | | |
|---|---|---|---|---|
| 2006/0258508 | A1* | 11/2006 | Tanioka | B60R 25/04 477/203 |
| 2013/0015929 | A1* | 1/2013 | Bryan | B60Q 11/005 335/7 |
| 2017/0197619 | A1* | 7/2017 | Kelly | B60W 10/04 |
| 2023/0174064 | A1* | 6/2023 | Kinoto | B60W 10/18 701/70 |

FOREIGN PATENT DOCUMENTS

| | | |
|---|---|---|
| JP | 2005-001566 | 1/2005 |
| JP | 2011-183983 | 9/2011 |
| JP | 2013-256165 | 12/2013 |
| JP | 2018-047795 | 3/2018 |
| JP | 2019-202647 | 11/2019 |

* cited by examiner

VEHICLE CONTROL DEVICE, VEHICLE CONTROL METHOD, AND STORAGE MEDIUM

TECHNICAL FIELD

The present invention relates to a vehicle control device, a vehicle control method, and a storage medium.

BACKGROUND ART

Conventionally, a driving assistance mode such as active cruise control (hereinafter referred to as "ACC") in which a vehicle travels while tracking another vehicle traveling in front of a host vehicle has been put into practical use. When the vehicle is allowed to travel in an ACC driving mode, the driver sets a maximum speed at the time of traveling, a distance from another vehicle traveling (tracked) in front of the vehicle, and the like and performs a travel start operation in the ACC driving mode. Thereby, the vehicle travels while maintaining a set distance within a set speed range and tracking other vehicles in front of the vehicle. Also, the ACC driving mode is canceled when the vehicle is traveling in the ACC driving mode, for example, by the driver depressing a brake pedal (see, for example, Patent Documents 1 to 3).

CITATION LIST

Patent Document

[Patent Document 1]
Japanese Unexamined Patent Application, First Publication No. 2019-202647
[Patent Document 2]
Japanese Unexamined Patent Application, First Publication No. 2013-256165
[Patent Document 3]
Japanese Unexamined Patent Application, First Publication No. 2018-047795

SUMMARY OF INVENTION

Technical Problem

Meanwhile, it is possible to unintentionally depress the brake pedal while causing the vehicle to travel in the ACC driving mode. Because the ACC driving mode is canceled in this case, it is assumed that the driver wants to continue the ACC driving mode. However, although a start and a cancelation of the ACC driving mode are described in the conventional technology, the continuation of the ACC driving mode is not considered.

For this reason, in order to allow the vehicle to travel in the ACC driving mode again after the ACC driving mode is canceled, the driver needs to perform the above-described operation of setting a maximum speed, a distance between the vehicle and another vehicle, and the like again. That is, the driver needs to perform an operation of starting traveling in the ACC driving mode again. However, a process of performing the operation of setting the ACC driving mode again is complicated for the driver.

The present invention has been made in consideration of such circumstances and an objective of the present invention is to provide a vehicle control device, a vehicle control method, and a program capable of continuing an ACC driving mode without any complicated operation after an operation of canceling the ACC driving mode is performed.

Solution to Problem

A vehicle control device, a vehicle control method, and a program according to the present invention adopt the following configurations.

(1): According to an aspect of the present invention, there is provided a vehicle control device including: a decider configured to decide on a start and a cancelation of a travel mode in which a vehicle travels at or below a target speed set according to an operation performed on an operation unit by a driver of the vehicle; and a controller configured to control traveling of the vehicle in the travel mode in accordance with a decision result of the decider, wherein the decider sets a state of the cancelation of the travel mode as a deferred state when the operation amount of a brake operation on a brake pedal of the vehicle is less than or equal to a threshold value if a cancelation operation of canceling the travel mode is performed according to the brake operation when the start of the travel mode is decided on in accordance with a first start operation of starting the travel mode and the controller controls the traveling in the travel mode, decides to continue the travel mode when a second start operation different from the first start operation is performed in the deferred state, and decides to cancel the travel mode when the operation amount exceeds the threshold value, when no operation is performed within a prescribed period in the deferred state, or when the cancelation operation is performed again in the deferred state.

(2): In the above-described aspect (1), the prescribed period is at least one of a period until a prescribed period of time elapses from the time when the cancelation operation is performed and a period until traveling of a prescribed distance is performed.

(3): In the above-described aspect (2), the first start operation includes at least an instruction operation of issuing an instruction to start the travel mode and a setting operation of setting the target speed, and the second start operation includes one or more operations among an accelerator operation on an accelerator pedal of the vehicle, the instruction operation, and the setting operation.

(4): In the above-described aspect (3), the decider makes the prescribed period for determining whether the second start operation has been performed different between the accelerator operation and the instruction operation and the setting operation.

(5): In the above-described aspect (4), the decider makes the prescribed period for determining whether the second start operation has been performed according to the accelerator operation shorter than the prescribed period for determining whether the second start operation has been performed according to the instruction operation and the setting operation.

(6): In any one of the above-described aspects (1) to (5), the decider decides to continue the travel mode when a travel speed of the vehicle has reached the target speed in the deferred state.

(7): In any one of the above-described aspects (1) to (6), the decider decides to continue the travel mode when a travel speed of the vehicle corresponding to an accelerator operation on an accelerator pedal of the vehicle in the deferred state has reached a speed-related threshold value close to the target speed.

(8): In any one of the above-described aspects (1) to (7), the decider decides to continue the travel mode when a depression amount of an accelerator pedal of the vehicle or a depression speed of the accelerator pedal in the deferred state has reached an accelerator-operation-related threshold value.

(9): In any one of the above-described aspects (1) to (8), the decider causes a notification of operation content of the second start operation to be provided by a notifier when the cancelation of the travel mode corresponding to the cancelation operation is deferred.

(10): In the above-described aspect (9), the decider causes a notification of operation content of the first start operation to be provided by the notifier when it is determined to cancel the travel mode.

(11): In any one of the above-described aspects (1) to (10), the controller controls a travel speed of the vehicle so that the travel speed of the vehicle is similar to a travel speed before the cancelation operation is performed when the cancelation of the travel mode is deferred.

(12): In any one of the above-described aspects (1) to (10), the controller controls the deceleration amount of the travel speed of the vehicle so that the deceleration amount of the travel speed of the vehicle is smaller than the deceleration amount corresponding to a depression amount of a brake pedal of the vehicle when the cancelation of the travel mode is deferred.

(13): In any one of the above-described aspects (1) to (12), the travel mode is a travel mode in which the vehicle travels while tracking another vehicle traveling forward at or below the target speed.

(14): According to an aspect of the present invention, there is provided a vehicle control method including: deciding, by a computer mounted in a vehicle, on a start of a travel mode in accordance with a first start operation of starting the travel mode when the start and a cancelation of the travel mode in which the vehicle travels at or below a target speed set according to an operation performed on an operation unit by a driver of the vehicle are decided on; setting, by the computer, a state of the cancelation of the travel mode as a deferred state when the operation amount of a brake operation on a brake pedal of the vehicle is less than or equal to a threshold value if a cancelation operation of canceling the travel mode is performed according to the brake operation while the vehicle is traveling in the travel mode; deciding, by the computer, to continue the travel mode when a second start operation different from the first start operation is performed in the deferred state; deciding, by the computer, to cancel the travel mode when the operation amount exceeds the threshold value, when no operation is performed within a prescribed period in the deferred state, or when the cancelation operation is performed again in the deferred state; and controlling, by the computer, traveling of the vehicle in the travel mode in accordance with a decision result.

(15): According to an aspect of the present invention, there is provided a program for causing a computer mounted in a vehicle to: decide on a start of a travel mode in accordance with a first start operation of starting the travel mode when the start and a cancelation of the travel mode in which the vehicle travels at or below a target speed set according to an operation performed on an operation unit by a driver of the vehicle are decided on; set a state of the cancelation of the travel mode as a deferred state when the operation amount of a brake operation on a brake pedal of the vehicle is less than or equal to a threshold value if a cancelation operation of canceling the travel mode is performed according to the brake operation while the vehicle is traveling in the travel mode; decide to continue the travel mode when a second start operation different from the first start operation is performed in the deferred state; decide to cancel the travel mode when the operation amount exceeds the threshold value, when no operation is performed within a prescribed period in the deferred state, or when the cancelation operation is performed again in the deferred state; and control traveling of the vehicle in the travel mode in accordance with a decision result.

Advantageous Effects of Invention

According to the above-described aspects (1) to (15), it is possible to continue an ACC driving mode without any complicated operation after an operation of canceling the ACC driving mode is performed.

DESCRIPTION OF EMBODIMENTS

Embodiments of a vehicle control device, a vehicle control method, and a program of the present invention will be described below with reference to the drawings.

[Overall Configuration]

Figure 1:
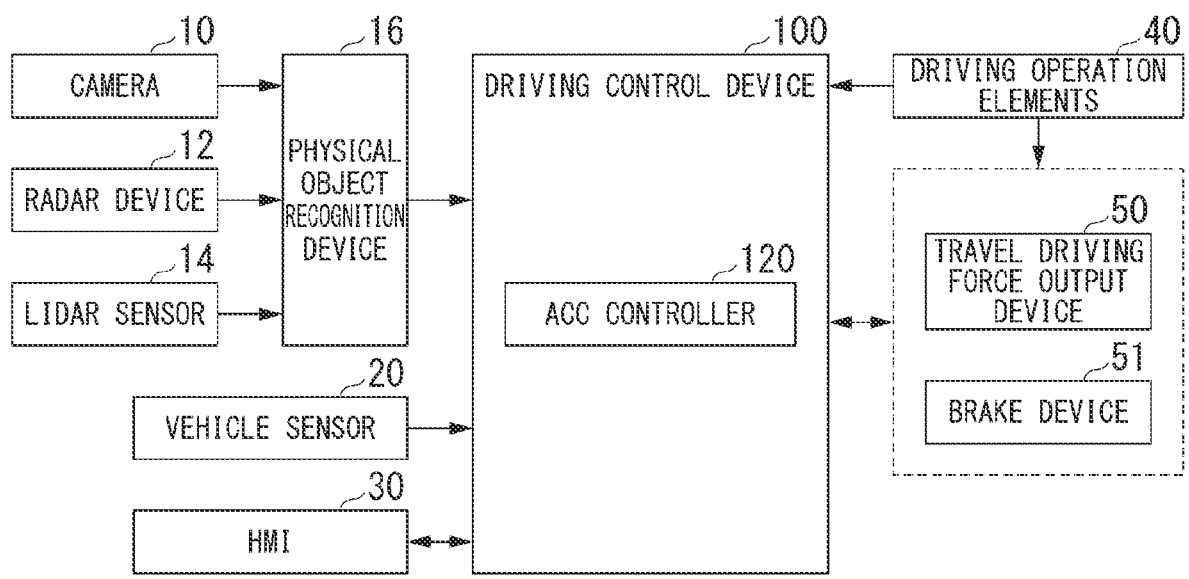
FIG. 1 is a configuration diagram of a vehicle system using a vehicle control device according to an embodiment.

FIG. 1 is a configuration diagram of a vehicle system using the vehicle control device according to an embodiment. A vehicle in which a vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a vehicle sensor 20, a human machine interface (HMI) 30, driving operation elements 40, a travel driving force output device 50, a brake device 51, and a driving control device 100. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge-coupled device (CCD) or a complementary metal-oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the driving control device 100. The physical object recognition device 16 may output detection results of the camera 10, the radar device 12, and the LIDAR sensor 14 to the driving control device 100 as they are. The physical object recognition device 16 may be omitted from the vehicle system 1.

The vehicle sensor 20 includes, for example, a vehicle speed sensor that detects the speed of the host vehicle M, an acceleration sensor that detects acceleration, a distance sensor that detects a travel distance of the host vehicle M, and the like. The vehicle sensor 20 outputs a detection result of each sensor to the driving control device 100.

The HMI 30 presents various types of information to an occupant of the host vehicle M and receives an input operation from the occupant. The HMI 30 outputs a signal indicating the received input operation to the driving control device 100. The HMI 30 includes various types of display devices, a speaker, a buzzer, a touch panel, a switch, keys, buttons, and the like.

Figure 2:
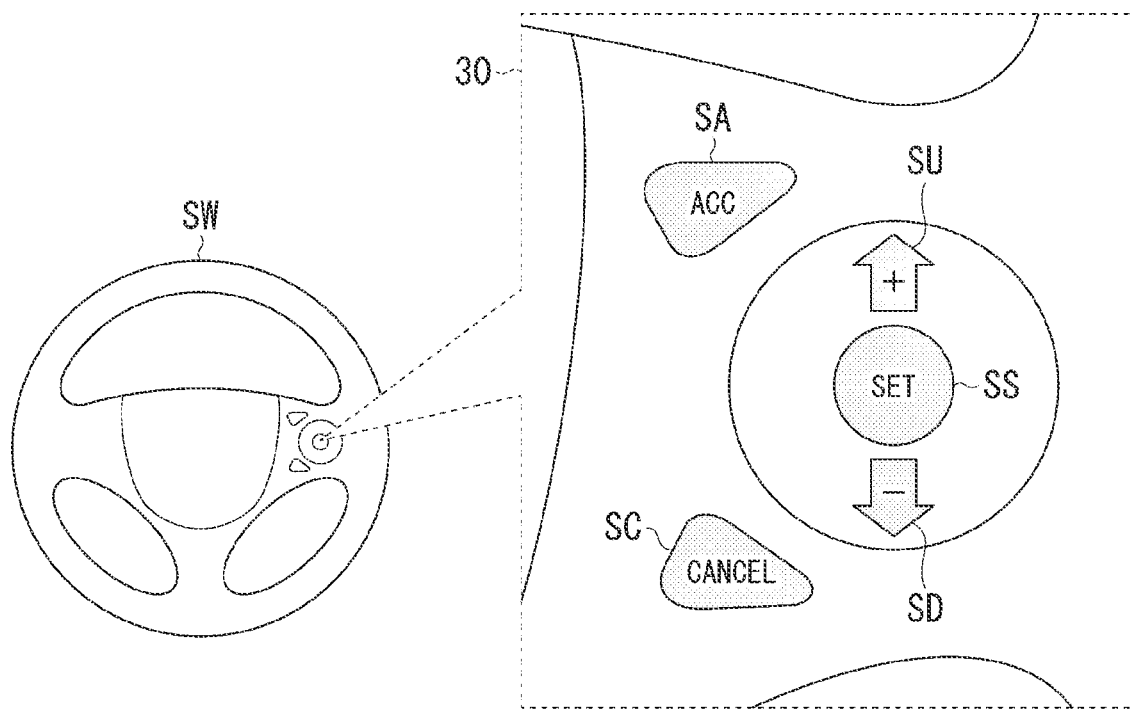
FIG. 2 is an arrangement diagram showing an example of an arrangement of an operation switch in a steering wheel.

In the vehicle system 1, as the HMI 30 relating to adaptive cruise control (hereinafter referred to as "ACC"), a plurality of operation switches are attached to a steering wheel provided in the host vehicle M. FIG. 2 is an arrangement diagram showing an example of an arrangement of operation switches on the steering wheel. In FIG. 2, an example of a steering wheel SW in which each operation switch for issuing an instruction for driving assistance of the host vehicle M in an ACC driving assistance mode (hereinafter referred to as an "ACC driving mode") is attached to the right-hand side gripped by the driver is shown. Although an example of the annular steering wheel SW is shown in FIG. 2, the steering wheel SW does not necessarily have to be annular, and may be in the form of an irregular steering wheel, a joystick, a button, or the like. An operation switch SA is an operation switch operated (pressed) by the driver when the start (activation) of the ACC driving mode is requested. An operation switch SU and an operation switch SD are operation switches that are operated (pressed) by the driver when the maximum speed at which the host vehicle M travels in the ACC driving mode to be started is set as a target travel speed (hereinafter referred to as a "target speed"). The driver increases the target speed by pressing the operation switch SU and decreases the target speed by pressing the operation switch SD. An operation switch SS is an operation switch that is operated (pressed) by the driver when the operation switch SU and the operation switch SD are operated to fix the set target speed and an instruction to start (activate) the ACC driving mode is issued. An operation switch SC is an operation switch that is operated (pressed) by the driver when a request or instruction to stop (cancel) the ACC driving mode is issued. As an operation switch relating to ACC, in addition to the above, an operation switch for setting a target distance (inter-vehicle distance) between the host vehicle M and another vehicle (hereinafter referred to as another vehicle V) when the host vehicle M tracks the other vehicle V traveling forward in the ACC driving mode may also be arranged on the steering wheel SW, and, for example, the operation switch SU and the operation switch SD may have a configuration in which the function changes to that of an operation switch for setting the inter-vehicle distance. The HMI 30 receives input operations for each operation switch by the driver and outputs a signal indicating the received input operation for each operation switch to the driving control device 100. The ACC driving mode is an example of a "travel mode."

Returning to FIG. 1, the driving operation elements 40 include, for example, an accelerator pedal, a brake pedal, a shift lever, and other operation elements in addition to the steering wheel. A sensor that detects the presence or absence of an operation on each operation element by the driver of the host vehicle M or an amount of operation is attached to the driving operation element 40 and its detection result is output to the driving control device 100 or one or both of the travel driving force output device 50 and the brake device 51. For example, an accelerator opening degree sensor is attached to the accelerator pedal and a detection result of detecting an amount of accelerator pedal depression (an amount of operation) by the driver is output to the driving control device 100 or the travel driving force output device 50. For example, a brake depression amount sensor is attached to the brake pedal and a detection result of detecting the amount of brake pedal depression (an amount of operation) by the driver is output to the driving control device 100 or the brake device 51.

The travel driving force output device 50 outputs a travel driving force (torque) for enabling traveling of the host vehicle M to driving wheels. For example, the travel driving force output device 50 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving control device 100 (including an ACC controller 120) or information input from the driving operation element 40.

For example, the brake device 51 is an electronically controlled hydraulic brake device including a brake caliper, a cylinder configured to transfer hydraulic pressure to the brake caliper, an electric motor configured to generate hydraulic pressure in the cylinder, and a brake ECU. The brake ECU is configured to control the electric motor in accordance with the information input from the driving control device 100 (including the ACC controller 120) or the information input from the driving operation element 40 and cause brake torque corresponding to a depression operation (a brake operation) of the driver on the brake pedal included in the driving operation elements 40 to be output to each wheel. The brake device 51 may include a mechanism configured to transfer the hydraulic pressure generated according to an operation of the driver on the brake pedal to the cylinder via a master cylinder as a backup. Also, the brake device 51 is not limited to the above-described configuration and may be an electronically controlled hydraulic brake device configured to control an actuator in accordance with information input from the driving control device 100 (including the ACC controller 120) and transfer the hydraulic pressure of the master cylinder to the cylinder.

The driving control device 100 includes at least the ACC controller 120. Each of the components provided in the ACC controller 120 and the driving control device 100 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the driving control device 100 or may be stored in a removable storage medium such as a DVD or a CD-ROM and installed in the HDD or the flash memory of the driving control device 100 when the storage medium (the non-transitory storage medium) is mounted in a drive device. The ACC controller 120 (which may be the driving control device 100 including the ACC controller 120) is an example of a "vehicle control device."

[Configuration of Driving Control Device]

Figure 3:
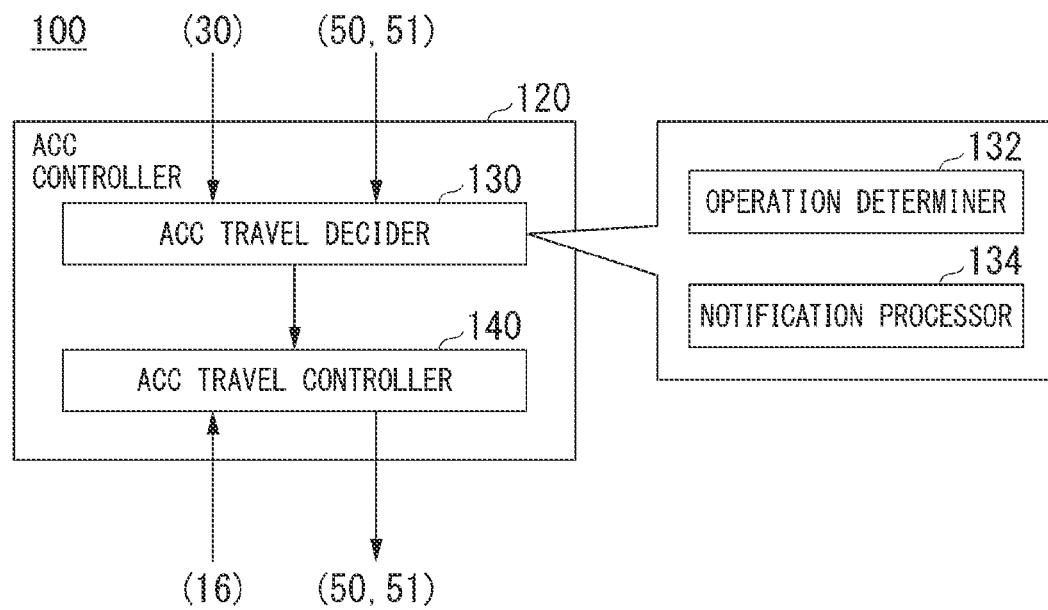
FIG. 3 is a functional configuration diagram of an ACC controller.

FIG. 3 is a functional configuration diagram of the ACC controller 120. The ACC controller 120 includes, for example, an ACC travel decider 130 and an ACC travel controller 140. The ACC travel decider 130 is an example of a "decider" and the ACC travel controller 140 is an example of a "controller."

The ACC travel decider 130 decides on the start and cancelation of the ACC driving mode on the basis of an input operation signal for the operation switch relating to the ACC attached to the steering wheel SW output by the HMI 30 and information indicating the operation amount output to the travel driving force output device 50 and the brake device 51, i.e., the presence or absence of the operation by the driver on the accelerator pedal or the brake pedal and the operation amount. In addition to these, the ACC travel decider 130 may decide to start and cancel the ACC driving mode including information of the detection result output by the vehicle sensor 20. The ACC travel decider 130 outputs information indicating the decided start or cancelation of the ACC driving mode to the ACC travel controller 140. The ACC travel decider 130 includes, for example, an operation determiner 132 and a notification processor 134. The operation switch relating to ACC attached to the steering wheel SW, the accelerator pedal, or the brake pedal is an example of an "operation unit."

The operation determiner 132 determines an operation relating to ACC by the driver. More specifically, the operation determiner 132 determines whether or not an instruction to start or cancel the ACC driving mode has been issued on the basis of the input operation signal output by the HMI 30. Here, an example of a procedure for operating each operation switch attached to the steering wheel SW when the driver issues an instruction to start or cancel the ACC driving mode will be described.

When the driver issues an instruction to start the ACC driving mode, each operation switch is operated according to the following procedure.

(Procedure S-1): First, the driver presses the operation switch SA. Thereby, for example, the HMI 30 causes a display device such as a liquid crystal display (LCD) incorporated in a dashboard or an instrument panel of the host vehicle M to display a display image for prompting the driver to set a target speed in ACC. An operation of procedure S-1 is an example of an "instruction operation."

(Procedure S-2): The driver changes the target speed by pressing the operation switch SU or the operation switch SD with reference to information of the target speed displayed on the display device by the HMI 30.

(Procedure S-3): The driver presses the operation switch SS when the information of the target speed displayed on the display device reaches the target speed to be set. Thereby, the target speed in the ACC driving mode is set (fixed). The driver may press the operation switch SS without performing procedure S-2. The target speed at this time may be changed (adjusted) by the driver performing an operation of depressing the accelerator pedal (including shallow or light depressing) and the like. In this case, a current travel speed of the host vehicle M is set (fixed) to the target speed in the ACC driving mode. In procedure S-2, the target speed may be set (fixed) when the change of the target speed by the driver is completed, i.e., when the pressing of the operation switch SU or the operation switch SD is stopped. The operation of procedure S-3 (including procedure S-2) is an example of a "setting operation."

According to such a procedure, the driver issues an instruction to start the ACC driving mode. The instruction to start the ACC driving mode according to the above-described procedure is a normal start operation in ACC (hereinafter referred to as an "ACC start operation"). The ACC start operation may include an operation of setting the inter-vehicle distance between the host vehicle M and another vehicle V tracked by the host vehicle M. The ACC start operation in the vehicle is not limited to the above-described procedure, and may be other operation procedures according to the specifications of the vehicle and the configuration of the operation switch provided in the vehicle. The ACC start operation is an example of a "first start operation."

On the other hand, if the driver issues an instruction to cancel the ACC driving mode when the host vehicle M is traveling in the ACC driving mode, there are two operations as follows. One is a method in which the driver presses the operation switch SC. The other is a method in which the driver depresses the brake pedal, i.e., applies the brake. The operation in which the driver cancels the ACC driving mode by pressing the operation switch SC or depressing the brake pedal is a normal cancelation operation in ACC (hereinafter referred to as an "ACC cancelation operation"). The ACC cancelation operation is an example of a "cancelation operation." The operation of depressing the brake pedal is an example of a "brake operation."

The ACC travel decider 130 decides to start or cancel the ACC driving mode on the basis of a result of determining the driver's operation relating to the ACC determined by the operation determiner 132. More specifically, the ACC travel decider 130 decides to start the ACC driving mode when the operation determiner 132 determines that the ACC start operation has been performed by the driver. On the other hand, the ACC travel decider 130 decides to cancel the ACC driving mode when the operation determiner 132 determines that the ACC cancelation operation has been performed by the driver.

Meanwhile, a case where a cancelation instruction is issued in a state in which the driver does not try to issue the instruction to cancel the ACC driving mode when the host vehicle M is traveling in the ACC driving mode is conceivable. For example, a case where the driver presses the operation switch SC while trying to operate a sound device provided in the host vehicle M is conceivable. For example, because another vehicle has entered between the host vehicle M and the other vehicle V tracked by the host vehicle M, the driver may feel endangered and depress the brake pedal (including shallow or light depressing). In this case, the operation determiner 132 determines that the instruction to cancel the ACC driving mode has been issued. However, because such a cancelation of the ACC driving mode is not intended by the driver, it is assumed that the driver immediately issues an instruction to start the ACC driving mode. The target speed (inter-vehicle distance) in the ACC driving mode at this time is a previously set target speed. For this reason, when the ACC driving mode has been canceled, the ACC travel decider 130 confirms whether or not the cancellation of the ACC driving mode is due to the depression of the brake pedal performed by the driver. Also, when the cancelation of the ACC driving mode is due to the depression of the brake pedal, the ACC travel decider 130 determines whether or not to cancel the ACC driving mode on the basis of the depression amount (the operation amount) of the brake pedal. More specifically, the ACC travel decider 130 decides on whether to cancel the ACC driving mode or to temporarily defer the cancelation of the ACC driving mode according to whether or not the depression amount of the brake pedal depressed by the driver exceeds the threshold value on the basis of information indicating the operation amount output to the brake device 51. The threshold value of the depression amount is, for example, a value for determining whether the driver has depressed the brake pedal shallowly, weakly, deeply, or strongly. When the brake pedal has been deeply or strongly depressed by the driver (i.e., when the depression amount exceeds the threshold value), the ACC travel decider 130 determines that an instruction to cancel the ACC driving mode has been issued and decides to cancel the ACC driving mode. On the other hand, when the brake pedal has been shallowly or weakly depressed by the driver (i.e., when the depression amount is less than or equal to the threshold value) or when the cancelation of the ACC driving mode is due to the pressing of the operation switch SC, the ACC travel decider 130 defers the cancelation of the ACC driving mode for a prescribed period. The prescribed period is, for example, a period until a prescribed period of time elapses from the time when the ACC driving mode is canceled or a period until the host vehicle M travels a prescribed distance from the time when the ACC driving mode is canceled. The prescribed period of time can be confirmed, for example, by a timer (which may be a count-down timer or a count-up timer). The prescribed distance can be confirmed, for example, by the detection result of the distance sensor provided in the vehicle sensor 20. The prescribed period may be an earlier or later period between a period until the prescribed period of time elapses and a period until the host vehicle M travels the prescribed distance. When the driver has performed a specific operation different from the ACC start operation within the prescribed period or when the travel state of the host vehicle M satisfies a prescribed condition (hereinafter referred to as a "continuation condition"), the ACC travel decider 130 cancels the cancelation of the ACC driving mode in a deferred state and continues (resumes) the ACC driving mode.

For this reason, the operation determiner 132 also determines a specific operation (hereinafter referred to as an "ACC continuation operation") for continuing the ACC driving mode performed by the driver within the prescribed period. The ACC continuation operation is, for example, an operation of pressing any operation switch relating to ACC other than the operation switch SC, such as the operation switch SA, the operation switch SU, or the operation switch SS, an operation of depressing the accelerator pedal (including shallow or light depressing), or the like. That is, the ACC continuation operation is an operation with fewer operation procedures than the ACC start operation. The ACC continuation operation may be a combination of any one or more of these operations. The determination of the ACC continuation operation in the operation determiner 132 may make the prescribed period different between an operation of pressing an operation switch other than the operation switch SC and an operation of depressing the accelerator pedal. For example, the operation determiner 132 makes a prescribed period for which the operation of depressing the accelerator pedal is an ACC continuation operation shorter than a prescribed period for which the operation of pressing an operation switch other than the operation switch SC is an ACC continuation operation. For example, the operation determiner 132 makes the prescribed period for which the operation of depressing the accelerator pedal is the ACC continuation operation longer than the prescribed period for which the operation of pressing the operation switch other than the operation switch SC is the ACC continuation operation. The ACC continuation operation is an example of a "second start operation." The operation of depressing the accelerator pedal is an example of an "accelerator operation."

Figure 4:
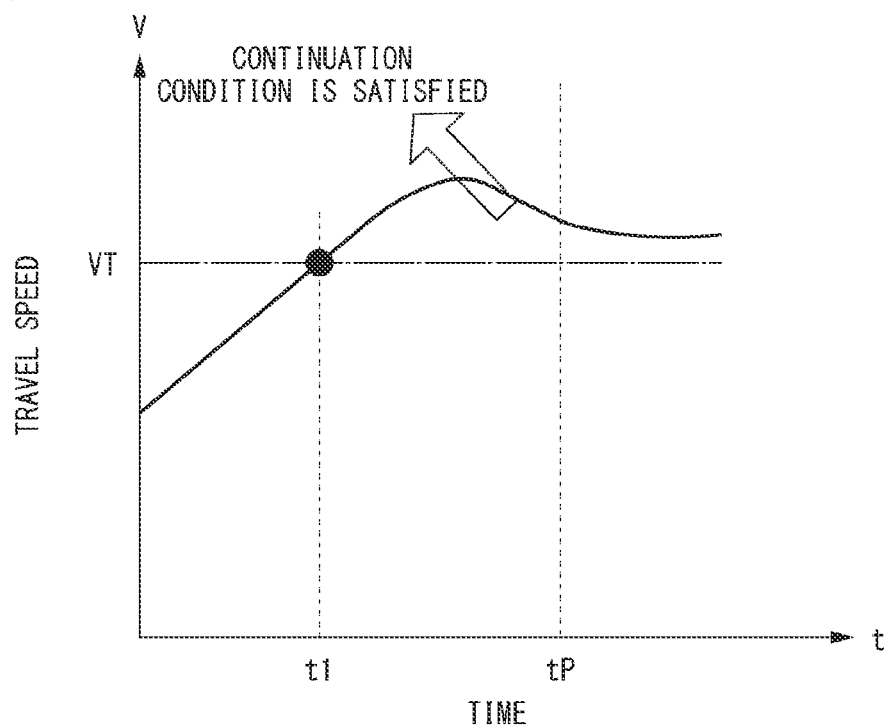
FIG. 4 is a diagram (part 1) for describing an example of a continuation condition under which the ACC controller causes an ACC driving mode to continue.
Figure 5:
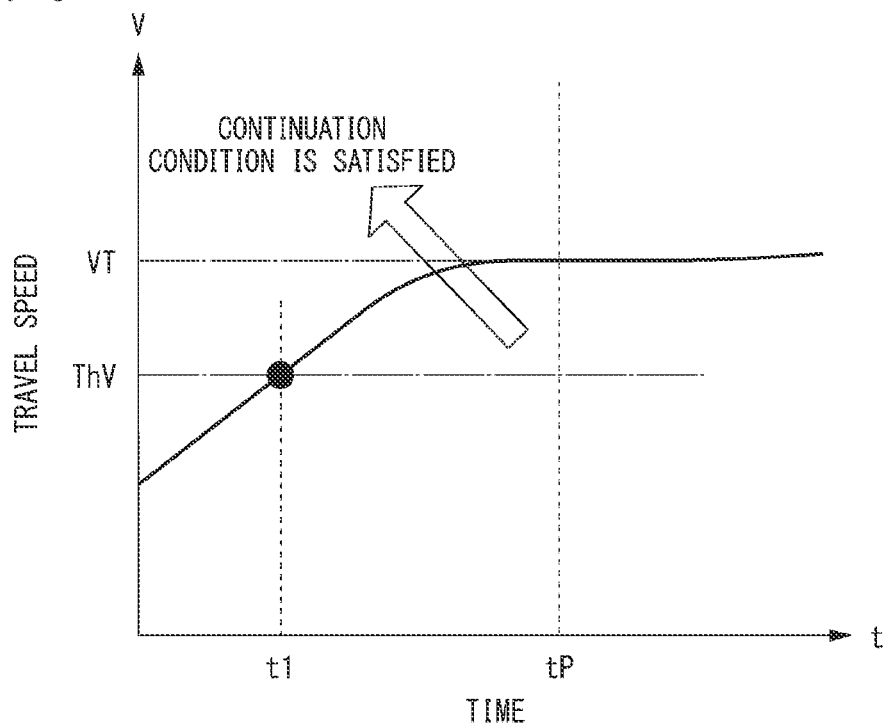
FIG. 5 is a diagram (part 2) for describing an example of a continuation condition under which the ACC controller causes the ACC driving mode to continue.
Figure 6:
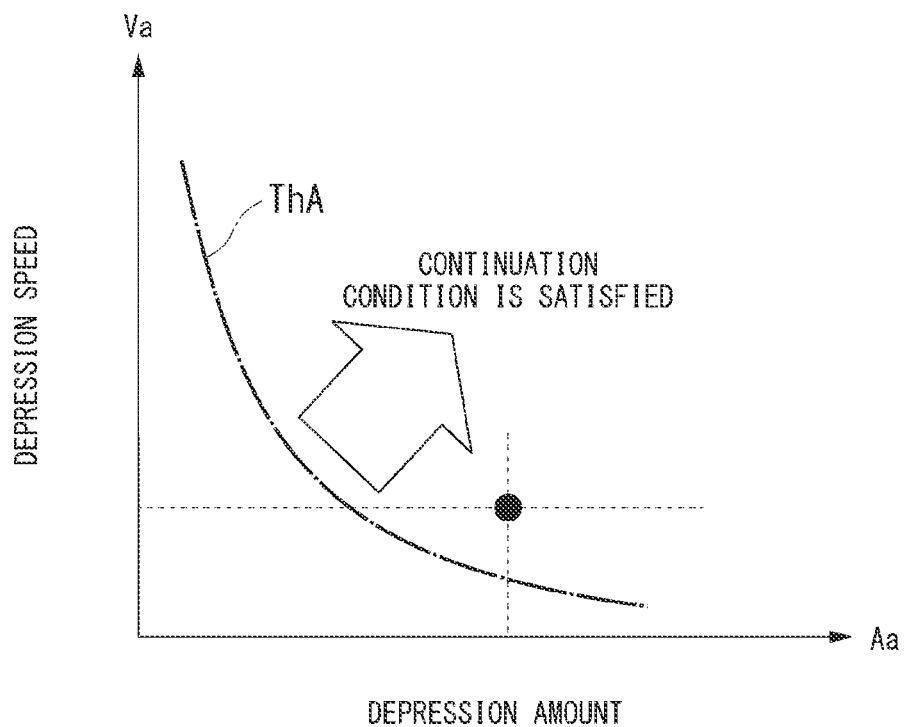
FIG. 6 is a diagram (part 3) for describing an example of a continuation condition under which the ACC controller causes the ACC driving mode to continue.

Furthermore, the operation determiner 132 determines whether or not the travel state of the host vehicle M satisfies the continuation condition on the basis of the depression amount (the operation amount) of the accelerator pedal depressed by the driver and the travel speed (the vehicle speed) of the host vehicle M. Here, an example of the travel state of the host vehicle M in which the ACC travel decider 130 causes the ACC driving mode in the deferred state to continue will be described. FIGS. 4 to 6 are diagrams for describing examples of a continuation condition under which the ACC controller 120 (the ACC travel decider 130) causes the ACC driving mode to continue.

First, an example of a continuation condition determined by a relationship between a travel speed V of the host vehicle M and time t will be described with reference to FIG. 4. When the cancelation of the ACC driving mode is deferred, the operation determiner 132 determines whether or not the travel state of the host vehicle M satisfies the continuation condition according to whether or not the travel speed V of the host vehicle M has reached a target speed VT set in the ACC start operation until prescribed time tP elapses. In FIG. 4, an example of a change in the travel speed V in a case where it is determined that the travel state of the host vehicle M satisfies the continuation condition when the travel speed V of the host vehicle M has reached the target speed VT at time t1 before the prescribed time tP is shown.

Next, another example of the continuation condition determined by the relationship between the travel speed V of the host vehicle M and time t will be described with reference to FIG. 5. When the cancellation of the ACC driving mode is deferred, the operation determiner 132 determines whether or not the travel state of the host vehicle M satisfies the continuation condition according to whether or not the travel speed V of the host vehicle M has reached a speed-related threshold value ThV close to the target speed VT until prescribed time tP elapses. The speed-related threshold value ThV is, for example, a speed obtained by subtracting a prescribed speed (for example, 5 to 10 [km/h]) from the target speed VT. In FIG. 5, an example of a change in the travel speed V in a case where it is determined that the travel state of the host vehicle M satisfies the continuation condition when the travel speed V of the host vehicle M has reached the speed-related threshold value ThV less than the target speed VT at time t1 before prescribed time tP is shown.

Next, an example of a continuation condition determined by a relationship between a depression speed Va of the accelerator pedal depressed by the driver and a depression amount Aa of the accelerator pedal depressed by the driver will be described with reference to FIG. 6. When the cancelation of the ACC driving mode is deferred, the operation determiner 132 determines whether or not the travel state of the host vehicle M satisfies the continuation condition according to whether the depression amount Aa or the depression speed Va has reached an accelerator-operation-related threshold value ThA. In FIG. 6, an example of a change in the travel speed V in a case where it is determined that the travel state of the host vehicle M satisfies the continuation condition when the relationship between the depression speed Va and the depression amount Aa is at a position of more than the accelerator-operation-related threshold value ThA is shown. The accelerator-operation-related threshold value ThA is an example of an "accelerator-operation-related threshold value."

The continuation condition under which the operation determiner 132 determines the travel state of the host vehicle M is not limited to the above-described continuation condition and may be any condition for continuing the ACC driving mode in the deferred state. For example, the continuation condition may be a condition determined by the relationship between the depression amount of the accelerator pedal depressed by the driver and a length of time in which this depression amount is maintained (the depressed state is maintained).

The continuation conditions under which the operation determiner 132 determines the travel state of the host vehicle M may be a combination of any one or more of the continuation conditions as described above. Here, the change in the travel state of the host vehicle M (the change in the travel speed V of the host vehicle M as shown in FIGS. 4 and 5 or the change in the relationship between the depression speed Va and the depression amount Aa as shown in FIG. 6) is caused by an operation in which the driver depresses the accelerator pedal. Therefore, in the following description, the operation on the accelerator pedal and the specific operation of pressing the operation switch with which the driver causes a change in the travel state of the host vehicle M are referred to as an "ACC continuation operation" without being distinguished.

When the operation determiner 132 determines that the ACC continuation operation has been performed by the driver within the prescribed period, the ACC travel decider 130 decides to continue the ACC driving mode, i.e., decides not to cancel the ACC driving mode. When the operation determiner 132 determines that the ACC continuation operation has not been performed by the driver within the prescribed period or determines that the ACC cancelation operation has been performed again by the driver within the prescribed period, the ACC travel decider 130 decides to cancel the ACC driving mode. The ACC travel decider 130 outputs information indicating a result of making the decision (a decision result) in relation to the ACC driving mode to the ACC travel controller 140. The decision result output by the ACC travel decider 130 to the ACC travel controller 140 also includes information indicating that the cancelation of the ACC driving mode is in the deferred state.

The notification processor 134 provides a notification to the driver by outputting operation content (for example, an operation method) relating to the ACC and information for providing a notification of a current ACC state (hereinafter referred to as "notification information") to the HMI 30. The notification information may be image information for displaying an image on a display device provided in the HMI 30 or may be sound information for causing a speaker (a sound output device) provided in the HMI 30 to output a sound. For example, when the operation switch SA has been pressed by the driver, the notification processor 134 outputs image information or sound information for guiding the driver to perform the above-described operation of procedures S-2 and S-3, i.e., the next operation to be performed to issue an instruction to start the ACC driving mode, to the HMI 30. For example, when the ACC driving mode is canceled and the prescribed period is reached, the notification processor 134 outputs image information and sound information for providing guidance indicating that an ACC continuation operation of continuing the ACC driving mode is possible (for example, "ACC can be continued by pressing the operation switch SA," "ACC can be continued by pressing the accelerator pedal," or the like) to the HMI 30. For example, when the ACC driving mode is canceled and the prescribed period is reached, the notification processor 134 may output a notification for canceling the ACC driving mode or image information or sound information of guidance for prompting the driver to perform the ACC cancelation operation again (for example, "ACC travel ends after 3 seconds," "ACC travel can immediately end if the operation switch SC is pressed," "ACC travel can immediately end if the brake pedal is depressed again," or the like) to the HMI 30. For example, when the ACC driving mode is canceled because the depression amount (the operation amount) of the brake pedal exceeds the threshold value or when the ACC continuation operation is not performed within the prescribed period even though the ACC driving mode is canceled, the notification processor 134 outputs image information or sound information for providing guidance indicating that ACC can start by performing the ACC start operation from the above-described procedure S-1 (for example, "ACC travel is possible if the operation switch SA is pressed" or the like) to the HMI 30. For example, when a light-emitting device such as a light-emitting diode (LED) is incorporated in each operation switch attached to the steering wheel SW, the notification processor 134 may be configured to output light emission information for causing an LED corresponding to the notification content to emit light to the HMI 30. For example, when the operation switch SA is pressed by the driver, the notification processor 134 may output light emission information for causing the LED incorporated in the operation switch corresponding to the above-described procedures S-2 and S-3 to emit light in the order of operations to the HMI 30 in addition to or in place of the above-described image information and sound information. For example, when the ACC driving mode is canceled and the prescribed period is reached, the notification processor 134 may output light emission information for causing an LED incorporated in an operation switch corresponding to the ACC continuation operation to emit light to the HMI 30 in addition to or in place of the above-described image information or sound information. For example, when the ACC driving mode is canceled and the prescribed period is reached, the notification processor 134 may output light emission information for causing an LED incorporated in the operation switch SC to emit light to the HMI 30 in addition to the above-described image information or sound information. For example, when the ACC driving mode is canceled because the depression amount (the operation amount) of the brake pedal exceeds the threshold value or when the ACC continuation operation is not performed within the prescribed period even though the ACC driving mode is canceled, the notification processor 134 may output light emission information for causing the LED incorporated in the operation switch SA to be initially operated when the ACC start operation is performed to emit light to the HMI 30 in addition to or in place of the above-described image information or sound information. The HMI 30, the display device for displaying image information, the sound output device for outputting a sound of sound information, or the light-emitting device for emitting light on the basis of light emission information is an example of a "notifier."

The ACC travel controller 140 controls the traveling of the host vehicle M in the ACC driving mode on the basis of information of a decision result relating to the ACC driving mode output by the ACC travel decider 130 and information input from the camera 10, the radar device 12, and the LIDAR sensor 14 via the physical object recognition device 16. More specifically, when information of a decision result indicating that the start of the ACC driving mode has been decided on is input from the ACC travel decider 130, the ACC travel controller 140 controls the travel driving force output device 50 and the brake device 51 so that the host vehicle M is allowed to travel in the ACC driving mode. When information of a decision result indicating that the cancelation of the ACC driving mode has been decided on is input from the ACC travel decider 130, the ACC travel controller 140 causes traveling based on the ACC driving mode in the host vehicle M to end. That is, the control for the travel driving force output device 50 and the brake device 51 in the ACC travel controller 140 ends. When information of the decision result indicating that the cancelation of the ACC driving mode is deferred is input from the ACC travel decider 130, the ACC travel controller 140 maintains the travel speed according to the ACC driving mode in the host vehicle M, i.e., controls the travel driving force output device 50 and the brake device 51 so that the host vehicle M is allowed to travel at a travel speed (for example, a travel speed of ±5 [km/h] or less) similar to that before the ACC cancelation operation is performed by the driver. When information of the decision result indicating that the cancelation of the ACC driving mode is deferred is input from the ACC travel decider 130, the ACC travel controller 140 may control the travel driving force output device 50 and the brake device 51 so that the deceleration amount of the travel speed based on the ACC driving mode in the host vehicle M is smaller than the deceleration amount corresponding to the brake pedal depression amount (the operation amount) of the driver. For example, the ACC travel controller 140 may cause the host vehicle M to be braked with a braking force weaker than a braking force corresponding to the amount of depression of the driver on the brake pedal corresponding to a so-called engine brake.

In addition to these, the ACC travel controller 140 may control the traveling of the host vehicle M in the ACC driving mode including (with reference to) the detection result information output by the vehicle sensor 20.

[Process of ACC Driving Mode]

Figure 7:
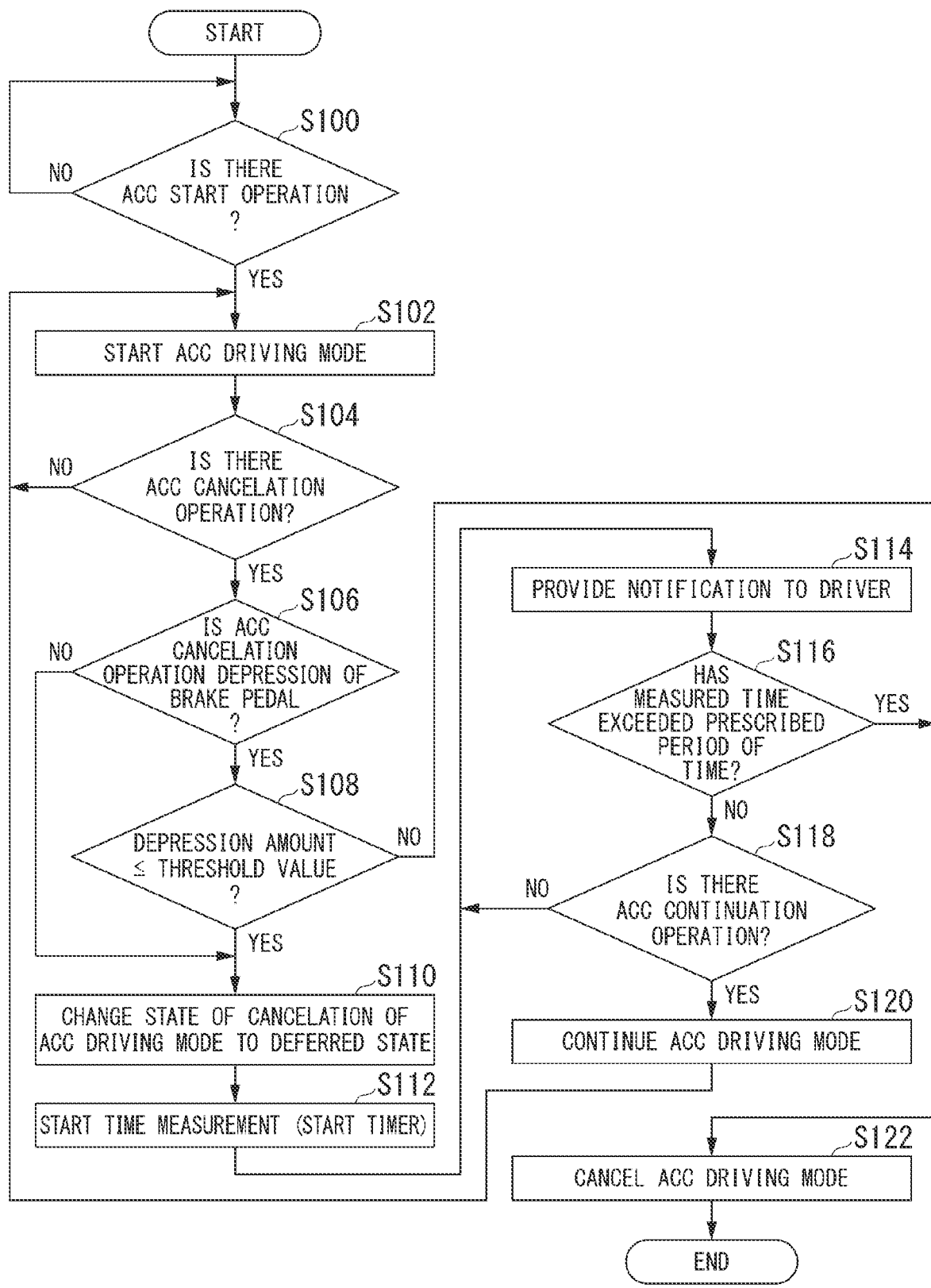
FIG. 7 is a flowchart showing an example of a flow of processing steps executed by the ACC controller.

FIG. 7 is a flowchart showing an example of a flow of a process executed by the ACC controller 120. The process of the present flowchart is repeatedly executed, for example, while the travel speed of the host vehicle M is a speed (for example, 60 [km/h]) or higher at which ACC travel is possible. In the following description, it is assumed that a prescribed period for which the ACC travel decider 130 defers the cancelation of the ACC driving mode is a prescribed period of time.

First, the ACC travel decider 130 confirms whether or not the operation determiner 132 has determined the ACC start operation by the driver (step S100). When it is confirmed that the operation determiner 132 has not determined the ACC start operation in step S100, the ACC travel decider 130 iterates the processing of step S100.

On the other hand, when the operation determiner 132 confirms that the ACC start operation has been determined in step S100, the ACC travel decider 130 decides to start the ACC driving mode (step S102). Also, the ACC travel decider 130 outputs information of a decision result indicating that the start of the ACC driving mode has been decided on to the ACC travel controller 140. Thereby, the ACC travel controller 140 performs travel control so that the host vehicle M is allowed to travel at a target speed or lower in accordance with the decision result indicating the start of the ACC driving mode output by the ACC travel decider 130.

Subsequently, the ACC travel decider 130 confirms whether or not the operation determiner 132 has determined the ACC cancelation operation by the driver (step S104). When it is confirmed that the operation determiner 132 has not determined the ACC cancelation operation in step S104, the ACC travel decider 130 returns the process to step S102 and continues to start the ACC driving mode, i.e., decides to continue traveling in the ACC driving mode. Thereby, travel control in the ACC driving mode by the ACC travel controller 140 is continued and the host vehicle M continuously travels in ACC.

On the other hand, when it is confirmed that the operation determiner 132 has determined the ACC cancelation operation in step S104, the ACC travel decider 130 confirms whether or not the ACC cancelation operation determined by the operation determiner 132 is due to the depression of the brake pedal (step S106). When it is confirmed that the ACC cancelation operation determined by the operation determiner 132 is not due to the depression of the brake pedal in step S106, the ACC travel decider 130 moves the process to step S110.

On the other hand, when it is confirmed that the ACC cancelation operation determined by the operation determiner 132 is due to the depression of the brake pedal in step S106, the ACC travel decider 130 confirms whether or not the amount of depression of the brake pedal determined to be the ACC cancelation operation by the operation determiner 132 is less than or equal to a threshold value (step S108). When it is confirmed that the amount of depression of the brake pedal is not less than or equal to the threshold value in step S108, i.e., the depression amount exceeds the threshold value, the ACC travel decider 130 moves the process to step S122.

On the other hand, when it is confirmed that the ACC cancelation operation is not due to the depression of the brake pedal in step S106 or when it is confirmed that the amount of depression of the brake pedal is less than or equal to the threshold value in step S108, the ACC travel decider 130 temporarily changes the state of the cancelation of the ACC driving mode to the deferred state (step S110). Also, the ACC travel decider 130 outputs information of the decision result indicating that the cancelation of the ACC driving mode is in the deferred state to the ACC travel controller 140. Thereby, the ACC travel controller 140 controls the traveling of the host vehicle M so that a travel speed based on the ACC driving mode is maintained or decreased by a small deceleration amount in accordance with a decision result indicating that the cancelation of the ACC driving mode output by the ACC travel decider 130 has been deferred.

The ACC travel decider 130 activates (starts), for example, a timer, and starts time measurement (step S112). Also, in the ACC travel decider 130, the notification processor 134 causes the HMI 30 to output notification information indicating that the ACC driving mode can be continued (step S114). Thereby, the HMI 30 provides the driver with guidance indicating that it is possible to continue the ACC driving mode in an ACC continuation operation with an image, a sound, or light emission of the light-emitting device in accordance with the notification information output by the notification processor 134.

The ACC travel decider 130 confirms whether or not the measured time has exceeded a prescribed period of time (step S116). When it is confirmed that the measured time has not exceeded the prescribed period of time (the prescribed period of time has not elapsed) in step S116, the ACC travel decider 130 confirms whether or not the operation determiner 132 has determined the ACC continuation operation of the driver (step S118). When it is confirmed that the operation determiner 132 has not determined the ACC continuation operation in step S118, the ACC travel decider 130 returns the process to step S114 and continues to iterate the processing of steps S114 to S118.

On the other hand, when it is confirmed that the operation determiner 132 has determined the ACC continuation operation in step S118, the ACC travel decider 130 cancels the cancelation of the ACC driving mode that has been temporarily deferred and decides to continue the ACC driving mode (step S120). Also, the ACC travel decider 130 outputs information of the decision result indicating that it is decided to continue the ACC driving mode, i.e., not to cancel the ACC driving mode, to the ACC travel controller 140. Thereby, the ACC travel controller 140 continues to perform travel control in the ACC driving mode in accordance with the decision result indicating the continuation of the ACC driving mode output by the ACC travel decider 130 and the host vehicle M continues to travel in ACC. At this time, the ACC travel controller 140 performs a control process so that the host vehicle M is allowed to travel at or below a target speed under travel control in accordance with a decision result indicating the start of the ACC driving mode including the acceleration of the host vehicle M when the travel control is performed so that the host vehicle M is decelerated by a small deceleration amount in accordance with a decision result indicating that the cancelation of the ACC driving mode has been deferred output by the ACC travel decider 130.

On the other hand, when it is confirmed that the brake pedal depression amount has exceeded the threshold value in step S108 or when it is confirmed that the measured time has exceeded the prescribed period of time (the prescribed period of time has elapsed) in step S116, the ACC travel decider 130 decides to cancel the ACC driving mode (step S122). Also, the ACC travel decider 130 outputs information of the decision result indicating that the decision to cancel the ACC driving mode has been made to the ACC travel controller 140. Thereby, the ACC travel controller 140 causes the travel control for the host vehicle M in the ACC driving mode to end in accordance with the decision result indicating the cancelation of the ACC driving mode output by the ACC travel decider 130. Also, the ACC travel decider 130 ends the process of the present flowchart in the travel control for the host vehicle M in the ACC driving mode. At this time, the ACC travel decider 130 may cause the HMI 30 to output notification information for causing the notification processor 134 to provide a notification indicating that it is necessary to perform the ACC start operation again when the ACC driving mode has been canceled or a travel process is performed in the ACC driving mode. Thereby, the HMI 30 provides the driver with guidance indicating that it is possible to start ACC by performing an ACC start operation with an image, a sound, or light emission of the light-emitting device in accordance with the notification information output by the notification processor 134.

According to the above-described process, the ACC controller 120 confirms whether or not an ACC cancelation operation is due to the depression of the brake pedal if the ACC cancelation operation is performed by the driver when the host vehicle M is allowed to travel in the ACC driving mode. Also, when the ACC cancelation operation is due to the depression of the brake pedal, the ACC controller 120 cancels the ACC driving mode if the depression amount of the brake pedal exceeds the threshold value and temporarily changes the state of the cancelation of the ACC driving mode to the deferred state if the depression amount of the brake pedal is less than or equal to the threshold value. Thereby, it is possible to continue the travel process in the ACC driving mode by performing the ACC continuation operation (also including an operation on the accelerator pedal for changing the travel state of the host vehicle M so that the continuation condition is satisfied) within a prescribed period of time when the driver unintentionally performs the ACC cancelation operation. Moreover, because the ACC continuation operation is an operation with fewer operation procedures than the ACC start operation, the driver can cause a travel process in the ACC driving mode that has been unintentionally canceled to continue with an operation procedure that is easier than the ACC start operation.

A case where a prescribed period for which the ACC travel decider 130 sets a state of the cancelation of the ACC driving mode to the deferred state is a prescribed period of time has been described in the example of the process of the ACC controller 120 shown in FIG. 7. However, the prescribed period may be a prescribed distance that the host vehicle M travels from the time when the ACC driving mode is canceled or both a prescribed period of time and a prescribed distance. In this case, it is only necessary for the process of the ACC controller 120 to be equivalent to an example of the above-described process by replacing the prescribed period of time in the example of the process of the ACC controller 120 shown in FIG. 7 with a prescribed distance or both a prescribed period of time and a prescribed distance.

As described above, according to the ACC controller 120 of the embodiment, the ACC travel decider 130 confirms whether or not the ACC cancelation operation from the driver is due to the depression of the brake pedal, causes the ACC driving mode to be immediately canceled when the depression amount (the operation amount) of the brake pedal exceeds the threshold value, and temporarily changes the state of the cancelation of the ACC driving mode corresponding to the ACC cancelation operation from the driver to the deferred state when the depression amount (the operation amount) of the brake pedal is less than or equal to the threshold value. Also, the ACC controller 120 of the embodiment causes the ACC driving mode set in the deferred state to continue when the ACC continuation operation (also including an operation on the accelerator pedal for changing the travel state of the host vehicle M so that the continuation condition is satisfied) is performed by the driver within a prescribed period or causes the ACC driving mode set in the deferred state to be canceled when there is no operation from the driver within the prescribed period or the ACC cancelation operation is performed again. Thereby, in the ACC controller 120 of the embodiment, when the driver unintentionally performs the ACC cancelation operation, the ACC driving mode can be continued without any complicated operation. On the other hand, in the ACC controller 120 of the embodiment, when the driver intentionally performs the ACC cancelation operation, the ACC driving mode can be canceled without any complicated operation.

The ACC controller 120 of the embodiment may be adopted in a vehicle equipped with an automated driving function. For example, the driving control device 100 of the embodiment may be a control device for executing the automated driving function. In this case, even if the ACC cancelation operation is performed while the vehicle is traveling by executing the ACC function included in the automated driving function, it is possible to continue the ACC function, i.e., continue the travel process based on the automated driving function, when the driver performs the ACC continuation operation if there is no factor other than ACC that stops the automated driving function.

The embodiment described above can be represented as follows.

A vehicle control device including:
a storage device storing a program; and
a hardware processor,
wherein the hardware processor executes the program stored in the storage device to:
decide on a start of a travel mode in accordance with a first start operation of starting the travel mode when the start and a cancelation of the travel mode in which a vehicle travels at or below a target speed set according to an operation performed on an operation unit by a driver of the vehicle are decided on;
set a state of the cancelation of the travel mode as a deferred state when the operation amount of a brake operation on a brake pedal of the vehicle is less than or equal to a threshold value if a cancelation operation of canceling the travel mode is performed according to the brake operation while the vehicle is traveling in the travel mode;
decide to continue the travel mode when a second start operation different from the first start operation is performed in the deferred state;
decide to cancel the travel mode when the operation amount exceeds the threshold value, when no operation is performed within a prescribed period in the deferred state, or when the cancelation operation is performed again in the deferred state; and
control traveling of the vehicle in the travel mode in accordance with a decision result.

Although modes for carrying out the present invention have been described above using embodiments, the present invention is not limited to the embodiments, and various modifications and substitutions can also be made without departing from the scope and spirit of the present invention.

REFERENCE SIGNS LIST

1 Vehicle system
10 Camera
12 Radar device
14 LIDAR sensor
16 Physical object recognition device
20 Vehicle sensor
30 HMI
40 Driving operation elements
50 Travel driving force output device
51 Brake device
100 Driving control device
120 ACC controller
130 ACC travel decider
140 ACC travel controller
132 Operation determiner
134 Notification processor

What is claim is:
1. A vehicle control device comprising a processor configured to execute computer-readable instructions to perform:
deciding on a start and a cancelation of a travel mode in which a vehicle travels at or below a target speed set according to an operation performed on an operation unit by a driver of the vehicle; and
controlling traveling of the vehicle in the travel mode in accordance with a decision result,
wherein the processor is further configured to perform:
setting a state of the cancelation of the travel mode as a deferred state when an operation amount of a brake operation on a brake pedal of the vehicle is less than or equal to a threshold value if a cancelation operation of canceling the travel mode is performed according to the brake operation when the start of the travel mode is decided on in accordance with a first start operation of starting the travel mode and controlling the traveling in the travel mode,
deciding to continue the travel mode when a second start operation different from the first start operation is performed in the deferred state, and
deciding to cancel the travel mode when the operation amount exceeds the threshold value, when no operation is performed within a prescribed period, which is at least one of a period until a prescribed period of time elapses from the time when the cancelation operation is performed and a period until traveling of a prescribed distance is performed, in the deferred state, or when the cancelation operation is performed again in the deferred state.

2. The vehicle control device according to claim 1,
wherein the first start operation includes at least an instruction operation of issuing an instruction to start the travel mode and a setting operation of setting the target speed, and
wherein the second start operation includes one or more operations among an accelerator operation on an accelerator pedal of the vehicle, the instruction operation, and the setting operation.

3. The vehicle control device according to claim 2,
wherein the processor is configured to execute the computer-readable instructions to perform:
making the prescribed period for determining whether the second start operation has been performed different between the accelerator operation and the instruction operation and the setting operation.

4. The vehicle control device according to claim 3,
wherein the processor is configured to execute the computer-readable instructions to perform:
making the prescribed period for determining whether the second start operation has been performed according to the accelerator operation shorter than the prescribed period for determining whether the second start operation has been performed according to the instruction operation and the setting operation.

5. The vehicle control device according to claim 2,
wherein the processor is configured to execute the computer-readable instructions to perform:
deciding to continue the travel mode when a travel speed of the vehicle corresponding to an accelerator operation on an accelerator pedal of the vehicle in the deferred state has reached a speed-related threshold value close to the target speed.

6. The vehicle control device according to claim 2,
wherein the processor is configured to execute the computer-readable instructions to perform:
deciding to continue the travel mode when a depression amount of an accelerator pedal of the vehicle or a depression speed of the accelerator pedal in the deferred state has reached an accelerator-operation-related threshold value.

7. The vehicle control device according to claim 1,
wherein the processor is configured to execute the computer-readable instructions to perform:
deciding to continue the travel mode when a travel speed of the vehicle has reached the target speed in the deferred state.

8. The vehicle control device according to claim 1,
wherein the processor is configured to execute the computer-readable instructions to perform:
causing a notification of operation content of the second start operation to be provided by a notifier when the cancelation of the travel mode corresponding to the cancelation operation is deferred.

9. The vehicle control device according to claim 8,
wherein the processor is configured to execute the computer-readable instructions to perform:
causing a notification of operation content of the first start operation to be provided by the notifier when it is determined to cancel the travel mode.

10. The vehicle control device according to claim 1,
wherein the processor is configured to execute the computer-readable instructions to perform:
controlling a travel speed of the vehicle so that the travel speed of the vehicle is similar to a travel speed before the cancelation operation is performed when the cancelation of the travel mode is deferred.

11. The vehicle control device according to claim 1,
wherein the processor is configured to execute the computer-readable instructions to perform:
controlling a deceleration amount of the travel speed of the vehicle so that the deceleration amount of the travel speed of the vehicle is smaller than a deceleration amount corresponding to a depression amount of a brake pedal of the vehicle when the cancelation of the travel mode is deferred.

12. The vehicle control device according to claim 1,
wherein the travel mode is a travel mode in which the vehicle travels while tracking another vehicle traveling forward at or below the target speed.

13. A vehicle control method comprising:
deciding, by a computer mounted in a vehicle, on a start of a travel mode in accordance with a first start operation of starting the travel mode when the start and a cancelation of the travel mode in which the vehicle travels at or below a target speed set according to an operation performed on an operation unit by a driver of the vehicle are decided on;
setting, by the computer, a state of the cancelation of the travel mode as a deferred state when an operation amount of a brake operation on a brake pedal of the vehicle is less than or equal to a threshold value if a cancelation operation of canceling the travel mode is performed according to the brake operation while the vehicle is traveling in the travel mode;
deciding, by the computer, to continue the travel mode when a second start operation different from the first start operation is performed in the deferred state;
deciding, by the computer, to cancel the travel mode when the operation amount exceeds the threshold value, when no operation is performed within a prescribed period, which is at least one of a period until a prescribed period of time elapses from the time when the cancelation operation is performed and a period until traveling of a prescribed distance is performed, in the deferred state, or when the cancelation operation is performed again in the deferred state; and
controlling, by the computer, traveling of the vehicle in the travel mode in accordance with a decision result.

14. A non-transitory computer-readable storage medium storing a program for causing a computer mounted in a vehicle to:
decide on a start of a travel mode in accordance with a first start operation of starting the travel mode when the start and a cancelation of the travel mode in which the vehicle travels at or below a target speed set according to an operation performed on an operation unit by a driver of the vehicle are decided on;
set a state of the cancelation of the travel mode as a deferred state when an operation amount of a brake operation on a brake pedal of the vehicle is less than or equal to a threshold value if a cancelation operation of canceling the travel mode is performed according to the brake operation while the vehicle is traveling in the travel mode;
decide to continue the travel mode when a second start operation different from the first start operation is performed in the deferred state;
decide to cancel the travel mode when the operation amount exceeds the threshold value, when no operation is performed within a prescribed period, which is at least one of a period until a prescribed period of time elapses from the time when the cancelation operation is performed and a period until traveling of a prescribed distance is performed, in the deferred state, or when the cancelation operation is performed again in the deferred state; and control traveling of the vehicle in the travel mode in accordance with a decision result.

* * * * *